United States Patent
Werner et al.

(10) Patent No.: US 10,566,615 B2
(45) Date of Patent: Feb. 18, 2020

(54) BATTERY AND METHOD FOR PRODUCING A BATTERY

(71) Applicant: Universitaet Stuttgart, Stuttgart (DE)

(72) Inventors: Juergen H. Werner, Stuttgart (DE); Markus Schubert, Tuebingen (DE); Juergen Koehler, Waiblingen (DE); Ahmed Garamoun, Stuttgart (DE); Christian Saemann, Stuttgart (DE)

(73) Assignee: Universitaet Stuttgart, Stuttgart (DE)

( * ) Notice: Subject to any disclaimer, the term of this patent is extended or adjusted under 35 U.S.C. 154(b) by 426 days.

(21) Appl. No.: 15/186,912

(22) Filed: Jun. 20, 2016

(65) Prior Publication Data

US 2016/0301068 A1 Oct. 13, 2016

Related U.S. Application Data

(63) Continuation of application No. PCT/EP2014/075659, filed on Nov. 26, 2014.

(30) Foreign Application Priority Data

Dec. 23, 2013 (DE) .................. 10 2013 114 767

(51) Int. Cl.
*H01M 4/13* (2010.01)
*H01M 10/26* (2006.01)
(Continued)

(52) U.S. Cl.
CPC ......... *H01M 4/386* (2013.01); *H01M 2/0285* (2013.01); *H01M 4/0423* (2013.01);
(Continued)

(58) Field of Classification Search
None
See application file for complete search history.

(56) References Cited

U.S. PATENT DOCUMENTS

| 2001/0018258 A1* | 8/2001 | Yoon, III ............ H01L 21/2257 438/530 |
| 2002/0031917 A1* | 3/2002 | Nire .................... C23C 14/0021 438/778 |

(Continued)

FOREIGN PATENT DOCUMENTS

| WO | 2004/086539 A1 | 10/2004 |
| WO | 2011/053736 A1 | 5/2011 |

OTHER PUBLICATIONS

International Search Report for PCT/EP2014/075659 dated Feb. 25, 2015; 12 pp.

(Continued)

*Primary Examiner* — Cynthia H Kelly
(74) *Attorney, Agent, or Firm* — Harness, Dickey & Pierce P.L.C.

(57) ABSTRACT

A method is disclosed for producing a battery preparing a first electrode by providing a substrate and depositing onto the substrate at least one silicon-based semiconductor layer of a specific porosity, in particular a doped micro-crystalline silicon layer that may comprise additions of Ge, Sn and/or C; treating the semiconductor layer using laser radiation for fully or partially varying the porosity, in particular by increasing the porosity of active regions for accommodating ions, in particular lithium-ions, or for reducing the porosity of inactive regions, for decreasing the ion-absorption capacity; arranging the first electrode together with a second electrode and an electrolyte within a housing; and contacting the two electrodes and connecting with external terminals accessible from outside the housing. Also disclosed is a battery made according to the disclosed method.

14 Claims, 5 Drawing Sheets

(51) Int. Cl.
*H01M 6/04* (2006.01)
*H01M 4/82* (2006.01)
*H01M 6/00* (2006.01)
*H01M 4/38* (2006.01)
*H01M 4/04* (2006.01)
*H01M 4/12* (2006.01)
*H01M 4/134* (2010.01)
*H01M 4/66* (2006.01)
*H01M 10/0525* (2010.01)
*H01M 2/02* (2006.01)
*H01M 12/06* (2006.01)
*H01M 4/02* (2006.01)

(52) U.S. Cl.
CPC ....... *H01M 4/0428* (2013.01); *H01M 4/0459* (2013.01); *H01M 4/12* (2013.01); *H01M 4/134* (2013.01); *H01M 4/661* (2013.01); *H01M 4/668* (2013.01); *H01M 10/0525* (2013.01); *H01M 12/06* (2013.01); *H01M 2004/021* (2013.01)

(56) References Cited

U.S. PATENT DOCUMENTS

| | | | |
|---|---|---|---|
| 2006/0040182 A1* | 2/2006 | Kawakami | H01M 10/052 429/218.1 |
| 2006/0040507 A1* | 2/2006 | Mak | H01L 21/02126 438/758 |
| 2010/0221606 A1 | 9/2010 | Nalamasu et al. | |
| 2011/0254128 A1* | 10/2011 | Kuriki | H01L 21/02532 257/532 |
| 2011/0318657 A1* | 12/2011 | Ein-Eli | H01M 4/38 429/405 |
| 2012/0231326 A1 | 9/2012 | Biswal et al. | |
| 2013/0078508 A1 | 3/2013 | Tolbert et al. | |
| 2013/0136973 A1 | 5/2013 | Shenoy | |
| 2014/0255799 A1* | 9/2014 | Anandan | H01M 4/861 429/405 |

OTHER PUBLICATIONS

English translation of International Preliminary Report on Patentability (Chapter I) for PCT/EP2014/075659; dated Jun. 28, 2016; 11 pp.

* cited by examiner

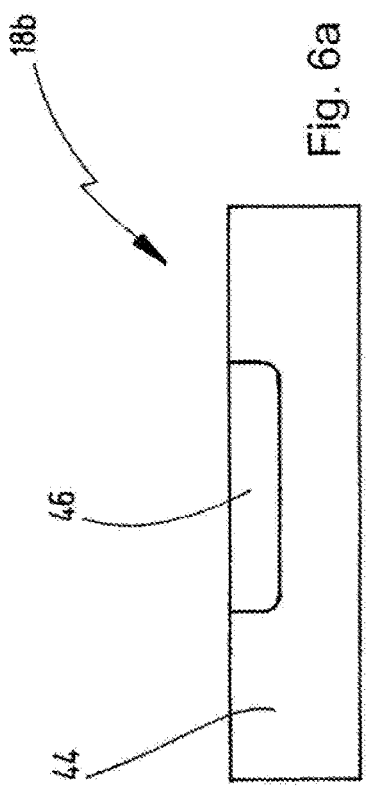
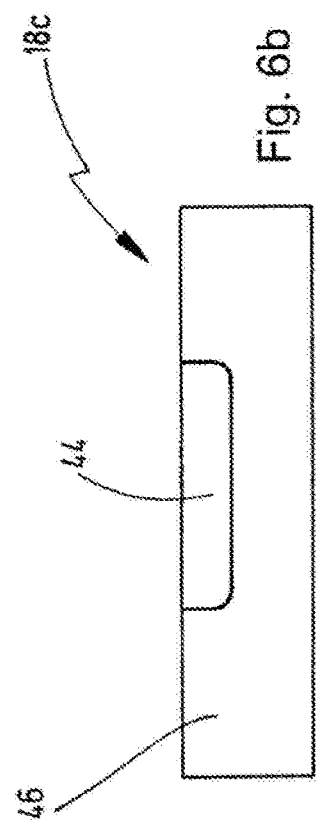
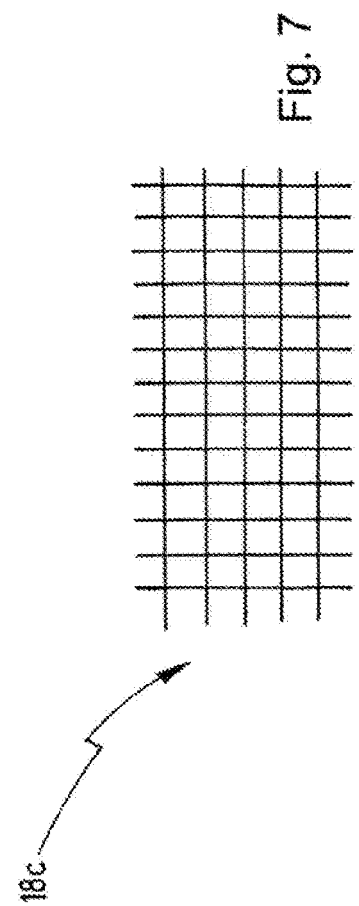
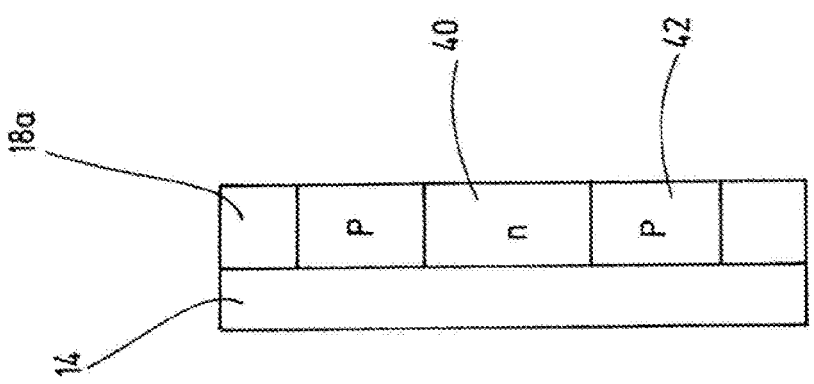
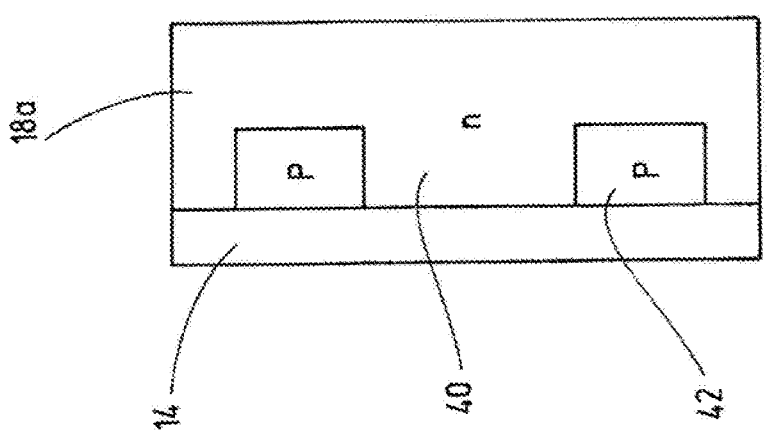

BATTERY AND METHOD FOR PRODUCING A BATTERY

CROSS-REFERENCES TO RELATED APPLICATIONS

This application is a continuation of international patent application PCT/EP2014/075659, filed on Jul. 2, 2015 designating the U.S.A., which international patent application has been published in German language and claims priority from German patent application 10 2013 114 767.4, filed on Dec. 23, 2013. The entire contents of these priority applications are incorporated herein by reference.

BACKGROUND OF THE INVENTION

The invention relates to a method for producing a battery, comprising the steps of:
preparing a first electrode by providing a substrate and depositing at least one semiconductor layer on the substrate;
generating a particular porosity across a particular region of the semiconductor layer;
arranging the first electrode together with a second electrode and an electrolyte within a housing;
contacting the two electrodes and connecting with external terminals accessible from outside the housing.

The invention further relates to a battery with two electrodes which are connected with each other by means of an electrolyte for allowing a current flow between the two electrodes.

Such a method and such a battery are known from U.S. 2010/02211606 A1.

Accordingly, at the beginning an electrically conductive substrate is provided and a semiconductor layer is deposited thereon and anodized, whereby pores are formed in the semiconductor layer. The first electrode generated in this way comprises an increased surface it is combined with a second electrode and with an electrolyte, for providing a battery. The substrate may be an endless foil which can be rolled to a cylindrical shape. By the anodizing the surface of the semiconductor layer is increased to generate a controlled, porous structure.

In the development of rechargeable lithium-ion-batteries up to now one has relied on carbon material with large surface as an anode material, such as Mesocarbon Microbeads (MCMB) to obtain a power density as high as possible.

However, the power density of carbon-based material is relatively limited.

Due to these reasons, different anode materials based on silicon have been developed lately. Differing from a storing of lithium between individual carbon layers, silicon forms an alloy with lithium. Negative electrodes based on silicon are of interest due to their high theoretical specific capacity which is considerably higher than the one of carbon.

However, a particular problem with the utilization of silicon as an electrode material rests in the considerable volume enlargement which is due to the intake of atoms which may lead to stresses, fracture generation and in the very end to a breakdown of the electrode. Due to this reason, according to U.S. 2010/0221606 A1 mentioned at the outset it was tried to prepare the silicon electrode with a controlled porosity for limiting the volume increase during the intake of lithium. However, the anodizing step used in this regard is not sufficient to counteract a swelling of the silicon layer sufficiently.

From U.S. 2012/0231326 A1 a further method for producing a rechargeable battery with an anode made of a porous silicon layer is known. Herein the porous silicon layer is generated by electrochemical etching and a subsequent coating with a passivation layer. For obtaining the porous silicon layer a particular etching treatment is performed.

However, the production method is complicated, and still the potential for limiting the volume increase during the intake of lithium ions is limited. Also in a lithium-ion-battery known from U.S. 2013/0078508 A1 an anode with porous silicon is utilized. The anode preferably is in the form of nano-fibers, a foil or a powder with porous silicon with pore diameters in the range of 2 nm to 100 nm and an average wall thickness in the range of 1 nm to 100 nm. For preparing the porous silicon layer, an etching method is used.

Also herein the production method is complex and still the capacity of the silicon layer for the intake of ions is relatively limited.

Apart from that, as an alternative to lithium-ion-secondary batteries also non-rechargeable metal/air batteries have been developed. Since a considerable time it has been worked on the development of silicon/air batteries that have a high theoretical energy density of 8470 Wh/kg.

Also herein the volume increase of the silicon layer during the intake of ions is one of the central problems.

SUMMARY OF THE INVENTION

In view of this, it is a first object of the invention to provide a battery with an improved electrode based on silicon that has a large capacity for receiving metal ions without leading to a damaging of the electrode by the volume increase associated therewith.

It is a second object of the invention to disclose an improved battery that can be produced on a large-scale basis.

It is a third object of the invention to disclose an improved battery that has an improved absorption capacity for lithium ions.

In addition, a suitable method for producing such a battery shall be disclosed.

According to one aspect of the invention this object is solved by a method for producing a battery, comprising the steps of:
(a) preparing a first electrode by providing a substrate and depositing onto said substrate at least one silicon-based semiconductor layer of a specific porosity and of a specific doping;
(b) treating said semiconductor layer using laser radiation for micro-stabilizing said semiconductor layer by varying by volume or locally, a porosity, a doping, or a crystallization, for increasing at least an ion-absorption capacity or a mechanical stability of said semiconductor layer;
(c) arranging said first electrode together with a second electrode and an electrolyte within a housing;
(d) contacting said two electrodes and connecting with external terminals accessible from outside said housing.

According to another aspect of the invention the object is solved by a battery comprising a housing, wherein two electrodes are provided which are connected with each other by means of an electrode for allowing a current flow between the two electrodes, wherein one of the electrodes comprises a micro-stabilized semiconductor layer on silicon basis which is at least partially porous, in particular a doped micro-crystalline silicon layer which may contain additions of Ge, Sn and/or C as well as locally limited regions with different doping and/or crystallinity and/or porosity.

The object of the invention is fully solved in this way.

Since the at least partially porous semiconductor layer on silicon basis is micro-stabilized, the semiconductor layer modified in this way has a particularly high potential for ion intake, while the mechanical stability is improved at the same time when compared to the prior art. Such a porous layer on silicon basis may be applied in secondary batteries as well as in primary batteries.

A micro-stabilization of the silicon layer according to the present invention is understood as a stabilizing against a swelling or a volume increase, respectively or as an improvement of the mechanical stability by a particular process step, namely by irradiating with a laser.

The laser radiation, can directly effect a micro-stabilization of the semiconductor layer. In addition, the semiconductor layer may be irradiated locally using a laser to effect a freeing of gases from the semiconductor layer precipitated before to thereby reach an increase of the porosity or a particular porosity when starting from a dense material.

In both cases a treatment by means of laser radiation is performed to reach a three-dimensional micro-stabilization of the semiconductor layer.

A further possibility for micro-stabilization rests in the generation of a region with local variations of doping, by means of laser assistance, preferably of p-type doped regions on a n-type doped semiconductor layer. p-typed doped regions embed less ions, in particular less lithium-ions. Thereby these regions may serve as support regions when the remaining regions are subject to a volume increase by ion intake, and thus the semiconductor layer can be mechanically stabilized. With locally n-type doped regions this tendency is less developed, but basically also present.

By means of the laser radiation, locally doped regions can be generated in a particularly simple way without lithography steps or masking steps, respectively, being necessary.

A further possibility for micro-stabilization rests in the generation of locally hardened grid points by local crystallization. This is obtained by a local radiation by means of a laser leading to a local melting and local crystallization, and thereby to a stabilization.

Also in this way a three-dimensional micro-stabilization of the semiconductor layer can be obtained. By the local crystallization at locally hardened grid points a stable three-dimensional micro-stabilization of the semiconductor layer can be ensured.

It will be understood that preferably several layers are deposited one above the other and can be micro-stabilized so that in this way also thicker layers can be prepared or treated, respectively, according to the method of the invention.

According to a further development of the invention, a semiconductor layer is treated for increasing the porosity of active regions for the intake of ions, in particular lithium-ions, or for reducing the porosity of inactive regions for reducing the intake of ions.

If active regions are treated by means of laser radiation, then the porosity can be increased locally, which leads to an increase of the ion intake capacity. On the contrary by reducing the porosity of inactive regions, a stabilization of a larger structure is made possible with regions of increased porosity having a high ion intake capacity therebetween.

According to a further development of the invention, the semiconductor layer in the shape of a three-dimensional skeleton having a grid width of 0.5 to 100 µm, preferably of 5 to 20 µm, is stabilized.

With such a dimensioning a particularly stable semiconductor layer can be ensured having a high ion intake potential, in particular for lithium-ions, and at the same time a high stability at low volume increase.

According to a further development of the invention, the semiconductor layer is deposited by means of a thin-layer deposition method. It may for instance be spraying, printing or a vacuum deposition method, in particular PVD (in particular sputtering or vapor depositing), PECVD or CVD.

Particularly preferred is a preparation by means of PECVD with excitation frequencies in the range of 10 kHz to 500 MHz, or in the microwave range.

According to a further development of the invention, a foil being preferably textured, preferably a metal foil or a plastic foil is used.

Thereby a particularly simple and cost effective preparation and a broad application range can be reached.

As a substrate herein for instance a plastic foil can be used which is metallized and contacted in a subsequent step, wherein for metallization possibly first a bonding agent layer, such as of titanium, can be applied.

According to a further development of the invention, the first electrode is combined with a second electrode in the form of an air cathode for forming a primary battery.

According to an alternative design of the invention, the battery is provided as a secondary battery, wherein between the electrodes there is arranged a separator.

In a battery according to the invention, the micro-stabilized semiconductor layer according to a first variant of the invention may be defined as a thin layer on a flexible substrate of an anode which is combined to a primary battery using an air cathode.

According to a further configuration of the invention, the micro-stabilized semiconductor layer is a thin layer having a p-type or n-type doping being selected from the group consisting of nitrogen, phosphorous, arsenic, antimony, boron, aluminum, gallium, and indium.

As an electrolyte preferably an alkaline electrolyte, in particular in the form of a KOH solution can be utilized. Of course also other electrolytes, such as in the form of a NaOH solution, can be used.

Apart from that it is possible to form the electrolyte as a non-aqueous electrolyte being selected from the group consisting of an ionic liquid, a mixture of a non-ion containing polar solvent in a cation and an anion, a conductive polymer, an oxidic ceramic, and mixtures thereof.

According to a further configuration of the invention, the electrolyte is contained in a flexible carrier material, in particular a porous foam or a cloth material.

Herein the electrolyte may for instance be configured as a gel.

Using these features, a simple and advantageous design of a battery is made possible, in particular with a rolled configuration, wherein the two electrodes together with the electrolyte are rolled to a coil structure. Preferably such a coil structure is encapsulated air-tight within a housing.

According to a further configuration of the invention, the micro-stabilized semiconductor layer is configured as a micro-crystalline, micro-porous layer which preferably comprises pores with an average pore diameter of at least 0.05 µm, preferably of at least 0.1 µm, further preferred of at least 0.15 µm, further preferred of at least 0.2 µm. Preferably the average pore size diameter is a maximum of 5 µm, further preferred a maximum of 2 µm.

It was found that such a design has a particularly high potential for ion intake with simultaneously decreased volume increase.

According to an alternative configuration of the invention, the battery is configured as a secondary battery, in particular as a lithium-ion battery comprising a separator for separating the two electrodes.

According to a further design of the invention, the micro-stabilized semiconductor layer is micro-porous and preferably comprises pores of an average pore diameter of 0.02 µm to 10 µm, further preferred of 0.1 to 1 µm.

According to a further development of the invention, the micro-stabilized semiconductor layer consists of a plurality of single layers which are arranged one above the other and preferably can be produced with known methods of thin layer deposition, e.g., from the gas phase. It may for instance be a spraying, printing or a vacuum deposition method, in particular PVD (sputtering or vapor deposition), PECVD or CVD.

In this way a semiconductor layer also with a larger layer thickness can be realized.

It will be understood that the afore-mentioned features and the features to be mentioned hereinafter cannot only be used in the given combination, but also in different combinations or independently without leaving the scope of the invention.

BRIEF DESCRIPTION OF THE DRAWINGS

Further features and advantages of the invention will become obvious from the subsequent description of preferred embodiments with reference to the drawings, of which:

FIGS. 5a and 5b illustrate the principle of a variation of the porosity of a silicon layer by means of local variation of the doping by laser radiation, shown from the top and in cross-section;

FIGS. 6a and 6b illustrate a cross-section through a silicon layer with locally increased porosity by means of radiation and with locally stabilized regions by means of radiation;

FIG. 7 illustrates a silicon layer in a grid structure with regions that are locally stabilized by irradiation.

DESCRIPTION OF PREFERRED EMBODIMENTS

Figure 1:
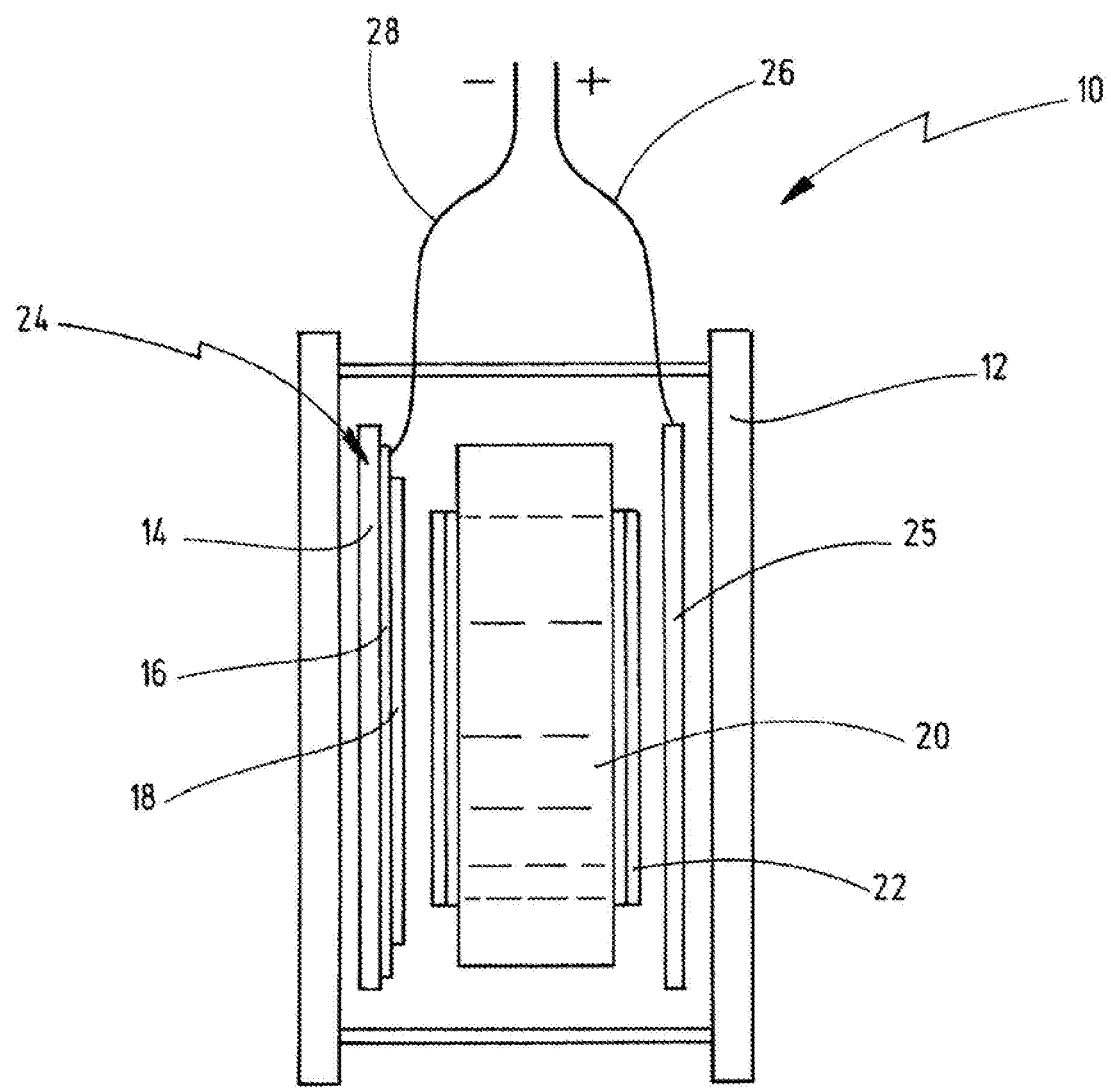
FIG. 1 is a schematic representation of an experimental cell configured as a silicon-air battery within a stainless steel housing.

In FIG. 1 the design of an experimental cell configured as a silicon-air battery is shown schematically and depicted in total with numeral 10.

Within a housing 12 of stainless steel a substrate 14 configured as a glass plate is provided. The substrate 14 is provided with an electrically conductive layer 16 whereon a doped, micro-crystalline silicon layer with a particular porosity is deposited. As an electrolyte 20 a solution of KOH with a strength of 0.01 M is provided, which is encapsulated by means of a rubber sealing 22. The doped silicon thin layer on the metallized substrate 14 forms the first electrode 24 which is led to the outside by means of a connection 28. The air electrode 25 serves as the second electrode being led to the outside by means of a connection 26.

Figure 2:
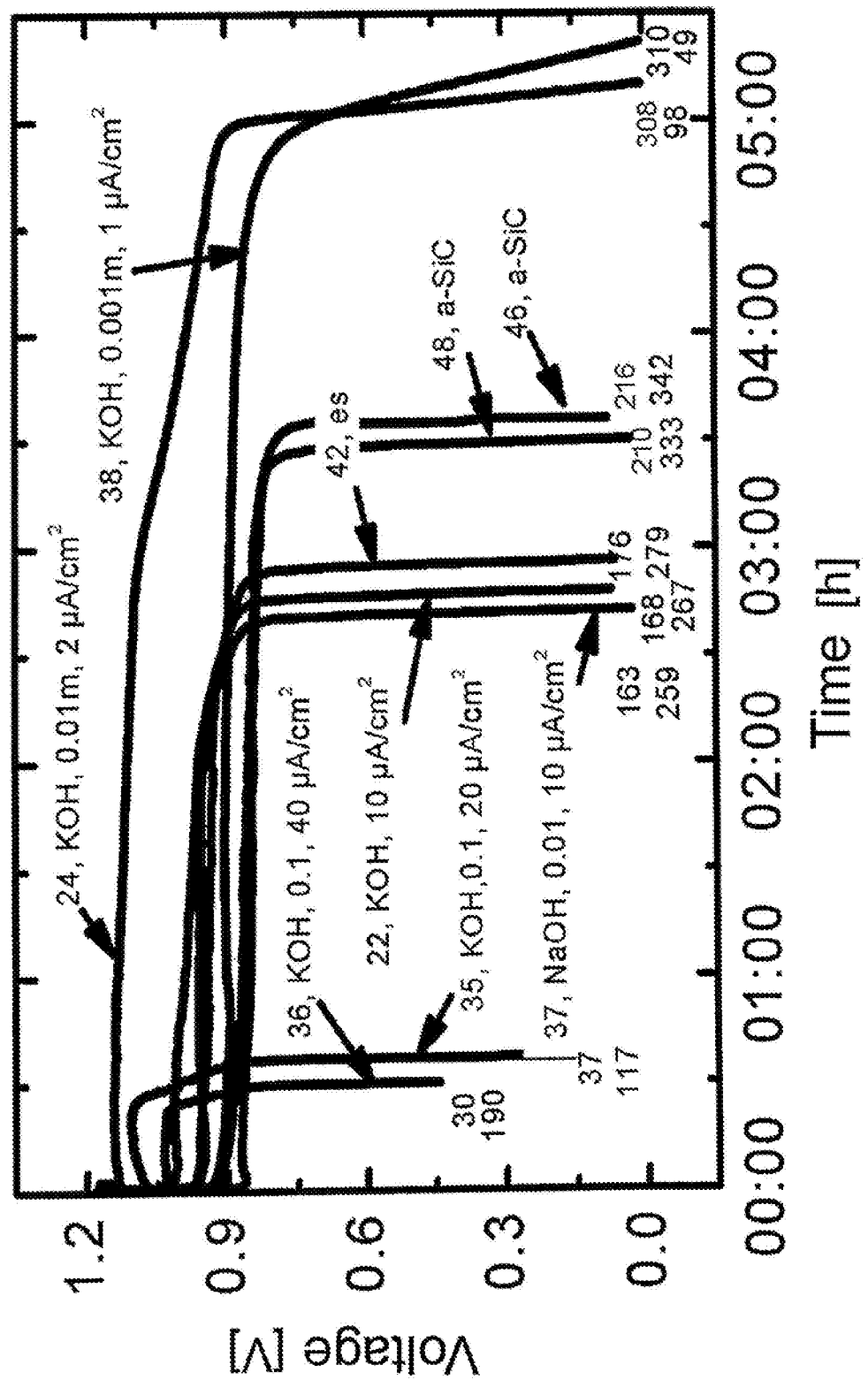
FIG. 2 is a graph illustrating different discharging curves of a thin-film silicon battery according to FIG. 1.
Figure 3:
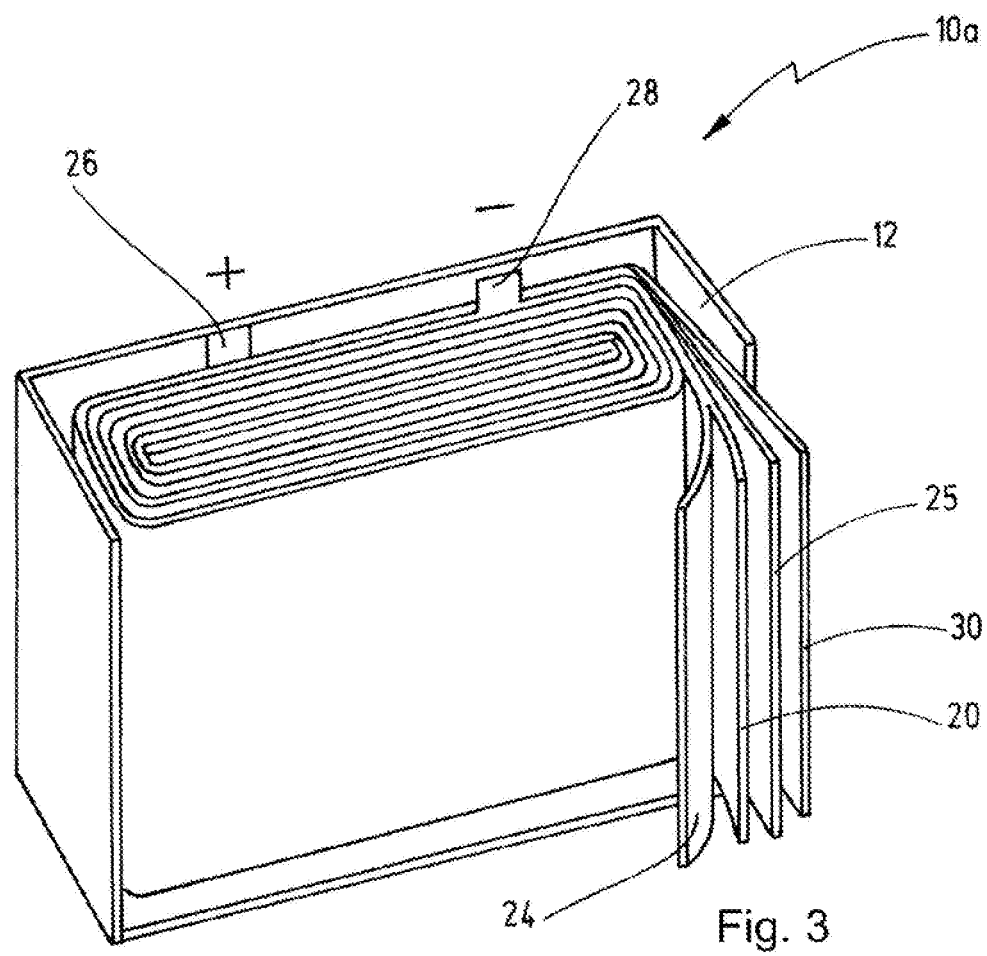
FIG. 3 is a perspective representation of a schematic structure of a coiled silicon-air battery.

FIGS. 1 to 3 relate to a non-rechargeable silicon-air battery, wherein the anode 24 consisting of a doped silicon thin layer during discharging is consumed radially. In a silicon-air battery cell basically there are two electrochemical reactions, namely on the one side the battery discharging reaction as a source of current flow between the electrodes, and secondly the silicon corrosion (self-discharge) by dissolving the silicon electrode in alkaline electrolyte. The discharge process may be described as:

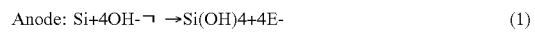

Anode: Si+4OH-⁻ →Si(OH)4+4E-   (1)

Cathode: O2+2H2O+4E-→4OH—   (2).

However, the corrosion (self-discharge) is as follows:

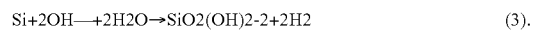

Si+2OH—+2H2O→SiO2(OH)2-2+2H2   (3).

As also with the wafer-based cells in the thin-layer cell, the forming of the oxidation product Si(OH)4 occurs at the anode. The alkaline electrolyte dissolves this oxide as soon as it is generated. Therefore, there is a continuous and permanent discharge process, as soon and as long as silicon is in contact with the electrolyte.

EXAMPLES

Example 1

With the battery 10 according to FIG. 1 a glass plate having a coating of conductive transparent metal oxide (trade name Asahi-U) was used as a substrate 14 that served as the electrical contacting layer. The texturing of the Asahi-U contact avoids a detaching of the silicon layer that is deposited thereon later on. The air electrode 25 on the right side of the battery 10 consists of polytetrafluorethylene powder (PTFE powder) and Carbon Black (0.45 to 0.5 g/cm2 loaded), catalyzed by manganese dioxide and pressed through a nickel grid with a grid size of 200 mesh. A micro-porous layer of PTFE was applied on the air side of the electrode. A separator is applied on the electrolyte side. The air electrode was provided by Electric Fuel Inc.

For the deposition of n-type doped thin layers of amorphous silicon (a-Si) or of silicon carbide (a-SiC), a PECVD process is used at a temperature of about 170° C., using silane (SiH4) as a silicon source, phosphine in silane (2% PH 3/SiH4) as a doping gas, as well as possibly methane (CH4) as a carbon source. The deposition rate is 10 nm/min. In this way a 500 nm thick n-type doped amorphous silicon or silicon carbon layer is generated on the electrically conductive substrate 14. The doped a-Si layer or a-SiC layer, respectively, were deposited with different conductivities and carbon contents. The active surface of the primary battery cell formed thereof is 4.5 cm2, this being limited by the diameter of the rubber sealing 22 according to FIG. 1. In the discharge experiments, batteries were used with varying electrolyte concentrations and discharge current densities with a Keithley 2400 Series Source Meter, used in "bias current mode".

FIG. 2 shows discharge curves of the a-Si and the a-SiC batteries with different electrolytes, concentrations and discharge current densities. Before discharging all samples were exposed to an etching in HF solution of less than 1% to remove oxides. Table 1 shows the specific capacity of the Si primary batteries for the different discharge procedures according to FIG. 2. The specific capacity herein was computed using the known volume of the a-Si layers and a-SiC layers, respectively, and a density of 2.1 g/cm3. With the a-SiC layer according to example 46, that is a-SiC, with 0.01 M KOH and a discharge current of 10 µA/cm2, a specific capacity of 342 Ah/kg was determined. The discharge curves show that there is no large difference between the utilization of KOH or NaOH as electrolyte.

| Sample No. | Deposition Gases (sccm) SiH$_4$/ PH$_3$/CH$_4$ | n a-Si/SiC Conductivity (Ω.cm) | Discharge Current Density [µA/cm$^2$] | Electrolyte Concentration [M] | Specific Capacity [Ah/kg] |
|---|---|---|---|---|---|
| 38 | 3/3/0 (a-Si) | 440 | 1 | KOH, 0.001 | 49 |
| 24 | 3/3/0 (a-Si) | 440 | 2 | KOH, 0.001 | 98 |
| 22 | 3/3/0 (a-Si) | 440 | 10 | KOH, 0.001 | 267 |
| 37 | 3/3/0 (a-Si) | 440 | 10 | NaOH, 0.01 | 259 |
| 42 | 3/3/0 (a-Si) | 440 | 10 | KOH, 0.1 | 279 |
| 35 | 3/3/0 (a-Si) | 440 | 20 | KOH, 0.1 | 117 |
| 36 | 3/3/0 (a-Si) | 440 | 40 | KOH, 0.1 | 190 |
| 46 | 3/3/1 (a-SiC) | 610 | 10 | KOH, 0.01 | 342 |
| 48 | 3/3/0 (a-Si) | 2135 | 10 | KOH, 0.01 | 333 |

As shown in equations (1) to (3) above, a part of the silicon is consumed as battery fuel, while the remainder is consumed by the self-discharging process. With the battery cell according to example 22 of table 1 from doped a-Si with a specific capacity of 267 Ah/kg while using 0.01 M KOH as electrolyte and a discharge current density of 10 µA/cm2 only about 7% of the deposited material were utilized as battery fuel. The measured self-discharge rate of about 2.5 mm/min of doped a-Si in 0.01 M KOH limits the specific capacity of the material. With a-SiC, a better usage is reached, see sample numbers 46 and 48 according to table 1. Herein about 9% of the a-SiC material were oxidized and served as fuel for the battery reaction. a-SiC shows a higher specific energy due to the lower self-discharge corrosion rate, since silicon-carbon bonds are stronger than the silicon-hydrogen bonds.

Example 2

By a locally pulsed laser radiation of the a-Si layers or the a-SiC layers, respectively, during deposition of the layers the enclosed gases can be freed and thus the porosity can be increased.

To this end for example a laser radiation with a line focus and a wavelength $\lambda=532$ nm at a pulse repetition frequency f=20 kHz is used. Herein the gas molecules, or gas atoms, respectively, present in the layer are strongly heated. By the temperature increase the gas pressure increases and bursts the surrounding silicon. The pores generated thereby have a size in the micrometer range. The porosity can be controlled by the energy density of the radiation by the laser. The pulse durations for example are between 210 and 230 nanoseconds with a pulse energy density Ep=0.47 Jcm$^{-2}$. The line focus width is about 4.5 µm.

The discharge current density is increased by increasing the porosity of the layers by laser radiation. However, with a specific capacity remaining constant that is limited by the present silicon volume, the operation duration of the Si-primary battery is decreased.

FIG. 3 shows a schematic of a design of a silicon-air battery in coiled form. Herein a thin silicon layer is deposited on a long flexible substrate (preferably metallized plastic). The electrode formed thereby is depicted with 24. Parallel thereto, an air electrode 25 is provided, wherein in between an electrolyte 20 configured as a gel paste is arranged. As the outer layer a foam layer 30 is provided which allows the access of air for diffusion to the air cathode 25. The layers 24, 20, 25, 30 are rolled one over the other and are encapsulated in housing 12 formed of stainless steel, wherein the terminals 26, 28 are guided to the outside.

Example 3

Figure 4:
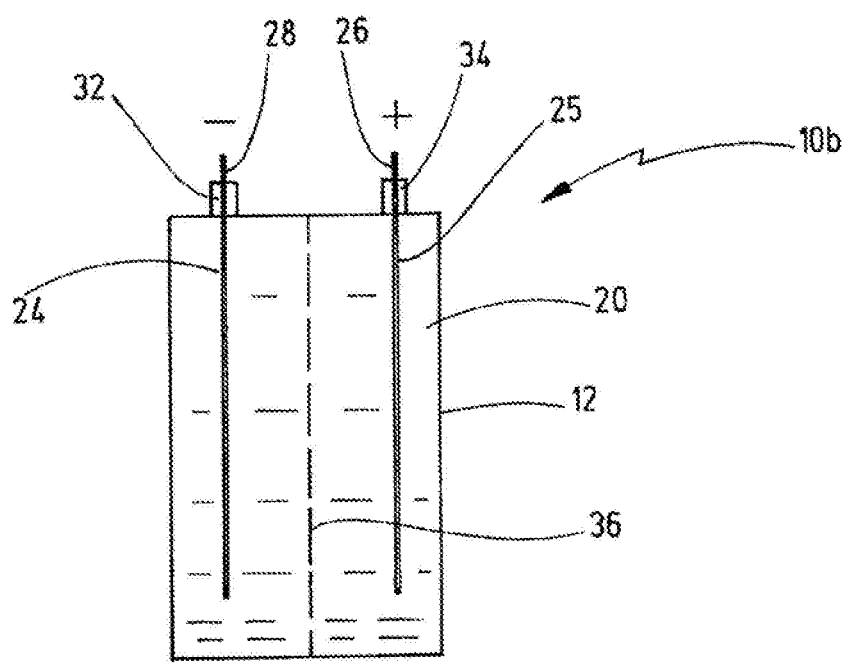
FIG. 4 is a schematic representation of a lithium-ion secondary battery comprising an electrode and a separator between the two electrodes according to the invention.

The basic design of a secondary battery according to the invention is shown in FIG. 4 and depicted in total with 10b. Within housing 12, a first electrode 24 and a second electrode 25 are arranged and are connected to the outside to terminals 28, 26 by means of assigned housing conduits 32, 34. Within the interior of the battery 10b, an electrolyte solution 20 is present. Between the electrodes 24, 25 there is a separator 36.

Such a secondary battery 10b uses a doped micro-crystalline silicon layer at the first electrode 24 having a controlled porosity and being three-dimensionally micro-stabilized.

Figure 8:
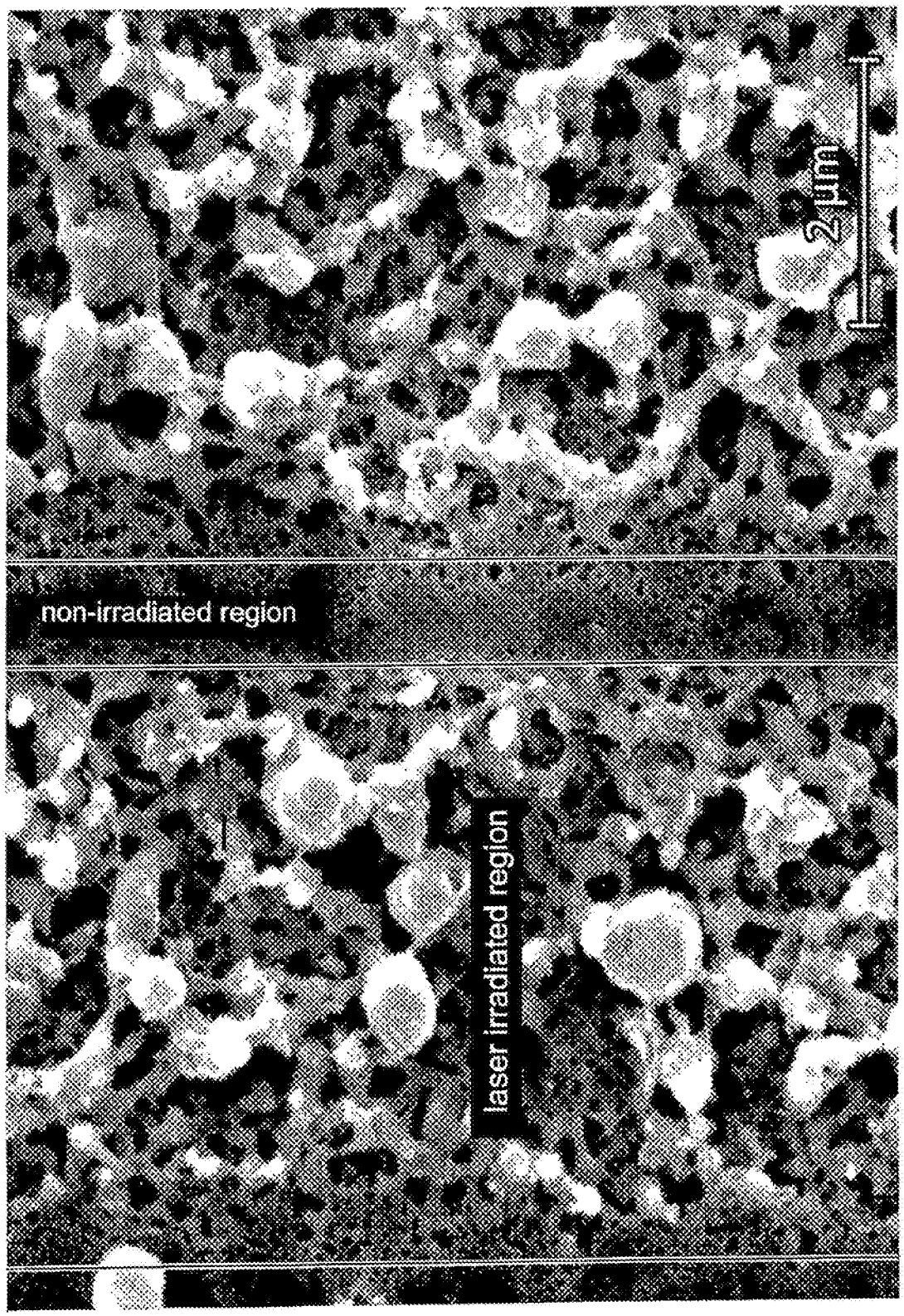
FIG. 8 is a scanning electron microscope picture of a silicon layer having a non-irradiated region with low porosity and a laser-irradiated region of high porosity.

FIG. 8 shows a silicon layer made porous by means of laser radiation. Initially there is a deposition of a 300 nm thick semiconductor layer of phosphorous-doped silicon by means of sputtering on a stainless steel substrate of the thickness d=25 µm. A locally pulsed laser radiation of the semiconductor layer with a line focus and a wavelength $\lambda=532$ nm at a pulse repetition frequency f=20 kHz makes it porous during the transition from the amorphous to the crystalline state. Herein the gas molecules or gas atoms, respectively present within the layer are strongly heated. By the temperature increase the gas pressure rises and bursts the surrounding silicon. The pores generated thereby have a size in the micrometer-range. The porosity can be controlled by the energy density of the radiation by the laser. The pulse durations in this example are between 210 and 230 nanoseconds with a pulse energy density Ep=0.47 Jcm−2. The line focus width is about 4.5 µm. The non-irradiated regions practically have no pores and serve for stabilizing the layer. The form of the irradiated or porous regions, respectively, as well as of the non-irradiated, non-porous regions by means of optical imaging of the laser radiation can be adjusted almost arbitrarily.

Example 4

FIGS. 5 a) and b) show the stabilization of a micro-crystalline silicon layer 18a by means of differently doped n-type and p-type regions. The local doping herein also may be reached by means of a laser radiation. Initially a planar coating with a doping agent is performed, and subsequently the laser radiation. The remaining, non-irradiated coating is subsequently removed again.

Example 5

FIG. 6a) shows a first possibility for preparing a micro-stabilized layer 18b on silicon basis: starting from a stable, non-porous Si-layer 44, this is made porous locally by laser radiation so that porous regions 46 are generated.

Example 6

FIG. 6b) shows a second possibility for preparing a micro-stabilized layer 18c on silicon basis: starting from a porous layer 46, this is molten by laser radiation, whereby it subsequently recrystallizes. The recrystallized region 44 is no more porous.

In this way a three-dimensional, porous grid structure 18c can be generated which is particularly suitable for ion intake, in particular for the intake of lithium-ions, and is reinforced in regular distances so that a cohesion also of larger structures is ensured.

Such a structure 18c is shown exemplarily in FIG. 7.

By the controlled porosity and by three-dimensional micro-stabilization of the silicon layer, a particularly high absorption capacity for lithium ions with simultaneously increased mechanical stability results, whereby the production of lithium-ion secondary batteries with high capacity and long-term cycling resistance can be reached.

What is claimed is:

1. A method for producing a battery, comprising the steps of:
    (a) preparing a first electrode by providing a substrate and depositing onto said substrate at least one silicon-based semiconductor layer of a specific porosity greater than zero, wherein the semiconductor layer includes gases and is of a specific doping;
    (b) treating said semiconductor layer using laser radiation for micro-stabilizing said semiconductor layer by freeing the gases contained within said semiconductor layer to thereby increase said porosity of said semiconductor layer locally for generating active porous regions having a locally increased ion intake capacity;
    (c) arranging said first electrode together with a second electrode and an electrolyte within a housing; and
    (d) contacting said two electrodes and connecting with external terminals accessible from outside said housing.

2. The method of claim 1, wherein said micro-stabilized semiconductor layer is a thin layer provided with a p-type or n-type doping being selected from the group consisting of nitrogen, phosphorous, arsenic, antimony, boron, aluminum, gallium and indium.

3. The method of claim 1, wherein said semiconductor layer is locally irradiated by laser radiation to generate pores.

4. The method of claim 1, wherein in step (a) a doping layer is deposited on the surface of the semiconductor layer, and in step (b) a local doping is generated by means of laser radiation, said local doping having a different ion-absorption capacity than any remaining regions of said semiconductor layer.

5. The method of claim 1, wherein said semiconductor layer is irradiated by means of a laser for generating locally strengthened grid points by local laser crystallization.

6. The method of claim 1, wherein said semiconductor layer in the shape of a three-dimensional skeleton having a grid width of 0.5 to 100 micrometers, is micro-stabilized.

7. The method of claim 1, wherein said semiconductor layer is deposited by spraying, printing, or by a vacuum deposition method.

8. The method of claim 7, wherein said semiconductor layer is deposited by means of PECVD using an excitation frequency in the range of 10 kHz to 500 MHz, or in the microwave range.

9. The method of claim 1, wherein said electrode is combined with a second electrode configured as an air-cathode for generating a primary battery.

10. The method of claim 1, wherein said battery is produced as a secondary battery, wherein between said electrodes a separator is arranged.

11. The method of claim 1, wherein an alkaline electrolyte material is used for preparing said electrolyte.

12. The method of claim 1, wherein a non-aqueous electrolyte material is used for preparing said electrolyte, said non-aqueous electrolyte material being selected from the group consisting of an ion-liquid, a mixture of a non-ion containing polar solvent and a cation and an anion, a conductive polymer, an oxidic ceramic, and mixtures thereof.

13. The method of claim 1, wherein a flexible carrier material is provided which is soaked with an electrolyte material.

14. The method of claim 1, wherein a gel is used for preparing said electrolyte.

* * * * *